US012569087B2

(12) United States Patent  (10) Patent No.: US 12,569,087 B2
Mandarino et al.  (45) Date of Patent: Mar. 10, 2026

(54) BROILER DISCHARGE RAMP

(71) Applicant: Marmon Foodservice Technologies, Inc., Osseo, MN (US)

(72) Inventors: Nicholas Mandarino, Aurora, IL (US); Steven Shei, Fort Wayne, IN (US); Christopher F. Zemko, Elgin, IL (US); Syed Rizvi, Aurora, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 854 days.

(21) Appl. No.: 17/895,624

(22) Filed: Aug. 25, 2022

(65) Prior Publication Data

US 2023/0066190 A1 Mar. 2, 2023

Related U.S. Application Data

(60) Provisional application No. 63/284,331, filed on Nov. 30, 2021, provisional application No. 63/237,806, filed on Aug. 27, 2021.

(51) Int. Cl.
*A47J 37/04* (2006.01)
*A47J 36/32* (2006.01)

(52) U.S. Cl.
CPC ............. *A47J 37/044* (2013.01); *A47J 36/32* (2013.01); *A47J 37/045* (2013.01)

(58) Field of Classification Search
CPC ......... A47J 37/044; A47J 36/32; A47J 37/045
See application file for complete search history.

(56) References Cited

U.S. PATENT DOCUMENTS

| | | | |
|---|---|---|---|
| 1,735,806 A | 11/1929 | Struble | |
| 3,292,525 A | 12/1966 | Jensen | |
| 3,791,370 A | 2/1974 | Fauser | |
| 4,154,152 A * | 5/1979 | Lang-Ree | A47J 37/044 99/391 |
| 4,188,866 A * | 2/1980 | Baker | A47J 37/044 99/446 |
| 4,188,868 A * | 2/1980 | Baker | A47J 37/044 99/386 |
| 4,297,942 A * | 11/1981 | Benson | A47J 37/044 99/388 |
| 5,182,982 A * | 2/1993 | Hattori | A47J 37/1214 99/511 |
| 5,983,785 A * | 11/1999 | Schreiner | A47J 37/0857 99/393 |
| 6,595,117 B1 | 7/2003 | Jones et al. | |

(Continued)

FOREIGN PATENT DOCUMENTS

WO 2020091840 A1 5/2020

OTHER PUBLICATIONS

Extended European Search Report for European Application No. 22192371.7, dated Dec. 22, 2022.

*Primary Examiner* — Elizabeth M Kerr
*Assistant Examiner* — Keith Brian Assante
(74) *Attorney, Agent, or Firm* — Andrus Intellectual Property Law, LLP

(57) ABSTRACT
A heat transfer system for heat treatment of a food product includes an enclosure with a food product inlet and a food product outlet. At least one conveyor extends into the enclosure from the food product inlet. At least one heat source is arranged relative to the at least one conveyor. A ramp at least partially extends below the at least one conveyor.

17 Claims, 9 Drawing Sheets

(56) References Cited

U.S. PATENT DOCUMENTS

| 7,451,691 B2 | 11/2008 | Robertson | |
| 7,468,495 B2 | 12/2008 | Carbone et al. | |
| 7,581,539 B2 | 9/2009 | Aviles | |
| 8,017,889 B2 | 9/2011 | Adamski | |
| 8,272,320 B2 | 9/2012 | Baker et al. | |
| 8,770,181 B2 | 7/2014 | Best | |
| 9,516,883 B1 * | 12/2016 | Huegerich | A21B 3/07 |
| 9,930,897 B2 | 4/2018 | Blue et al. | |
| 10,722,074 B2 | 7/2020 | Schlosser et al. | |
| 11,206,946 B2 | 12/2021 | Shei | |
| 2001/0001462 A1 * | 5/2001 | Chandler | A47J 37/044 |
| | | | 198/626.1 |
| 2004/0194777 A1 | 10/2004 | Antoniello | |
| 2006/0006163 A1 | 1/2006 | Carbone et al. | |
| 2007/0221199 A1 | 9/2007 | Hake et al. | |
| 2010/0051010 A1 | 3/2010 | Colburn et al. | |
| 2010/0209578 A1 * | 8/2010 | Fredlund | F26B 17/026 |
| | | | 426/456 |
| 2011/0226230 A1 | 9/2011 | Reese et al. | |
| 2014/0116268 A1 * | 5/2014 | Bigott | A47J 39/003 |
| | | | 99/483 |
| 2014/0199446 A1 | 7/2014 | Huegerich | |
| 2017/0095112 A1 * | 4/2017 | Baker | A47J 36/00 |
| 2017/0099986 A1 | 4/2017 | Patel et al. | |
| 2017/0219216 A1 | 8/2017 | Livchak et al. | |
| 2018/0238560 A1 | 8/2018 | Deng et al. | |
| 2018/0289209 A1 | 10/2018 | Yazvin et al. | |
| 2019/0208964 A1 * | 7/2019 | Bauer | G07F 9/105 |
| 2019/0290063 A1 | 9/2019 | Shei | |
| 2021/0127688 A1 | 5/2021 | Sammon et al. | |
| 2021/0127898 A1 * | 5/2021 | Sammon | A47J 36/32 |

* cited by examiner

BROILER DISCHARGE RAMP

CROSS-REFERENCE TO RELATED APPLICATIONS

The present application claims priority of U.S. Provisional Patent Application No. 63/237,806, filed on Aug. 27, 2021 and claims priority of U.S. Provisional Patent Application No. 63/284,331, filed on Nov. 30, 2021, the contents of both of these applications are incorporated by reference in their entireties.

BACKGROUND

The present disclosure relates to heat treatment of food. More specifically, the present disclosure relates to a warming and holding device for cooked food product in a cooking appliance. In various embodiments, the cooking appliance may be a broiler, oven, toaster, or the like for cooking, baking, or toasting a plurality of food items.

Heat transfer systems may be used to provide thermal energy to a broiler, oven, toaster, or the like for use in the heat treatment of food items to achieve cooking, baking, or toasting of the food item. Conveyor systems move the food item in relation to a heat transfer system to achieve a continuous cooking, baking, or toasting process. Similar conveyor systems are used in industrial applications for heat treatment, drying, and curing processes. In the present disclosure, the exemplary embodiment of a chain-driven charbroiler cooking a hamburger patty will be used, although it will be recognized that other forms of broilers, ovens, or toasters may be similarly configured and other foods, including, but not limited to pizza, pizza crusts, bread, buns, toasted sandwiches, chicken cuts or patties, fish cuts or patties, beef cuts, plant or other protein patties, or the aforementioned hamburger patties may be heat treated in the manners as described herein.

U.S. Patent Application Publication No. 2018/0289209 discloses a conveyor toaster which includes a conveyor assembly with a bracket and a conveyor belt. The conveyor belt rotates about the first and second gears. A drive motor operates to move the conveyor belt about The first and second gears. A platen is configured to be heated and is positioned relative to the conveyor belt. A mounting bracket is connected to the bracket of the conveyor assembly. Movement of the mounting bracket changes the position of the conveyor assembly relative to the platen. This application is incorporated by reference herein in its entirety.

U.S. Pat. No. 11,206,946 relates to a heat transfer system and a broiler and is incorporated by reference herein in its entirety. The heat transfer system includes a mixing chamber that surrounds the heat source. An air inlet provides a flow of pressurized air into the mixing chamber. The mixing chamber directs the flow of air past the heat source or direct heating of the flow of air by the heat source. The flow of air is further directed out of the mixing chamber through an outlet to impinge upon a food product.

U.S. Patent Application Publication No. 2014/0199446 relates to a conveyor toaster with a housing and a split-conveyor; International Publication Number WO2020/091840 discloses a belted warmer assembly with a heated rotating drum, a belt roller, and a belt; U.S. Pat. No. 6,595,117 discloses a high-speed variable size toaster; and U.S. Pat. No. 9,585,400 discloses a conveyor oven with a sensor positioned to detect an event that will cause a decrease in the internal temperature of a tunnel, each of these references is incorporated herein by reference in their entireties.

U.S. Patent Application Publication No. 2021/0127688, entitled Dynamic Cooking with Limited Control Authority Conveyor Compensation, U.S. Patent Application Publication No. 2021/0127898, entitled Cooking Appliance with Cooked Food Holding Apparatus, and U.S. patent application Ser. No. 17/749,649, entitled System and Method of Broiler Heating Element Control all disclose heat transfer systems for cooking a food product, for example, a hamburger patty. These references are incorporated herein by reference in their entireties.

Brief Disclosure

An example of a heat transfer system for heat treatment of a food product includes an enclosure with a food product inlet, a food product outlet, and a plurality of walls. At least one conveyor extends into the enclosure from the food product inlet. At least one heat source is arranged relative to the at least one conveyor. The at least one heat source is configured to output heat towards the at least one conveyor. A ramp at least partially extends below the conveyor. At least one baffle is positioned intermediate to the ramp from the at least one conveyor and the at least one heat source.

In further examples of the heat transfer system, the at least one baffle is connected between opposing side walls of the plurality of walls. The at least one baffle may extend across a width of the enclosure between the opposing side walls. The at least one baffle is elongated in a vertical dimension compared to a depth dimension. The at least one baffle may be a plurality of baffles. Lower edges of the baffles may be evenly spaced apart from a surface of the ramp. The baffles may be spaced apart in a depth dimension and are staggered in a vertical dimension. The baffles may be configured to be heated by radiant heat from the at least one heat source and cooled by convective cooling with airflow entering the enclosure through the food product outlet.

In additional examples of the heat transfer system, the at least one conveyor includes an inlet end and an interior end. An upper end of the ramp is positioned in proximity to the interior end of the at least one conveyor and a lower end of the ramp is positioned below the at least one conveyor. The ram may be configured to receive food product from the at least one conveyor and direct the food product towards the food product outlet. A warming assembly may be defined within the enclosure interior of the food product outlet. The warming assembly may be configured to removably receive therein a pan positioned below the lower end of the ramp. An entry portion of the ramp may include upper end of the ramp and an exit portion of the ramp includes the lower end of the ramp. The entry portion is at a first angle and the exit portion is at a second angle. The first angle is greater than the second angle. The at least one heat source may be positioned below the conveyor. A drip tray includes a lower end and an upper end. The drip tray is positioned within the enclosure below the at least one conveyor and the at least one heat source. The drip tray is angled within the enclosure with the lower end proximate the ramp compared to the upper end of the drip tray.

A heat transfer system for heat treatment of a food product includes an enclosure having a food product inlet, a food product outlet, and a plurality of walls. At least one conveyor extends into the enclosure from the food product inlet. The at least one conveyor extends from an inlet end to an interior end. At least one heat source is arranged relative to the at least one conveyor. The at least one heat source is configured to output heat towards the at least one conveyor. A ramp extends from the conveyor towards the food product outlet. The ramp includes an entry portion comprising an upper end of the ramp and the upper end is positioned in proximity to the interior end of the at least one conveyor, the entry portion having a first angle. The ramp includes an exit portion having a lower end of the ramp and the lower end of the ramp is positioned in below the at least one conveyor. The exit portion has a second angle. The first angle is greater than the second angle.

In further examples of the heat transfer system, the ramp includes a surface treatment configured to promote sliding of food product on the ramp. The first angle is greater than 45 degrees and less than 90 degrees and the second angle is less than 45 degrees and greater than 0 degrees. The first angle may be greater than 60 degrees and less than 80 degrees. The ramp may include a plurality of lanes separated by dividers. The dividers may be unitary with the ramp. A plurality of baffles may be positioned intermediate to the ramp from the at least one conveyor and the at least one heat source. The plurality of baffles are configured to be heated by radiant heat from the at least one heat source and cooled by convective cooling with airflow entering the enclosure through the food product outlet. A warming assembly may be defined within the enclosure interior of the food product outlet. The warming assembly may be configured to removably receive therein a pan positioned below the lower end of the ramp.

DETAILED DISCLOSURE

In conveyor broilers, food products are moved on one or more conveyors past heat sources to heat treat the food products to cook the food products. The conveyor may deposit the food products onto a discharge ramp. It has been observed that discharge ramps in broilers can become fouled with carbonized grease and food particulates from the food cooked on the conveyor. During operation of the broiler, the heat from the heat sources heats the discharge ramp to temperatures which can carbonize grease and food particulates, grease accumulation within a broiler can lead to flare-ups within the broiler. Discharge ramp fouling has been observed to increase absorption of radiant heat energy, further increasing the temperature of the discharge ramp, leading to more carbonization. Also, fouled discharge ramps increase the friction between the ramp and food products, grease, or food particulates directed by the discharge ramps. The friction slows movement, resulting in longer contact with the discharge ramp and more carbonization. Discharge ramp fouling results in dedicated worker time to clean the ramps, and over time, degradation of the discharge ramp itself. One previous solution has been to apply adhesive sheets of polytetrafluoroethylene (PTFE) or another similar polymer material which fouls and is replaceable at regular intervals to reduce friction and remove the fouling.

Figure 1:
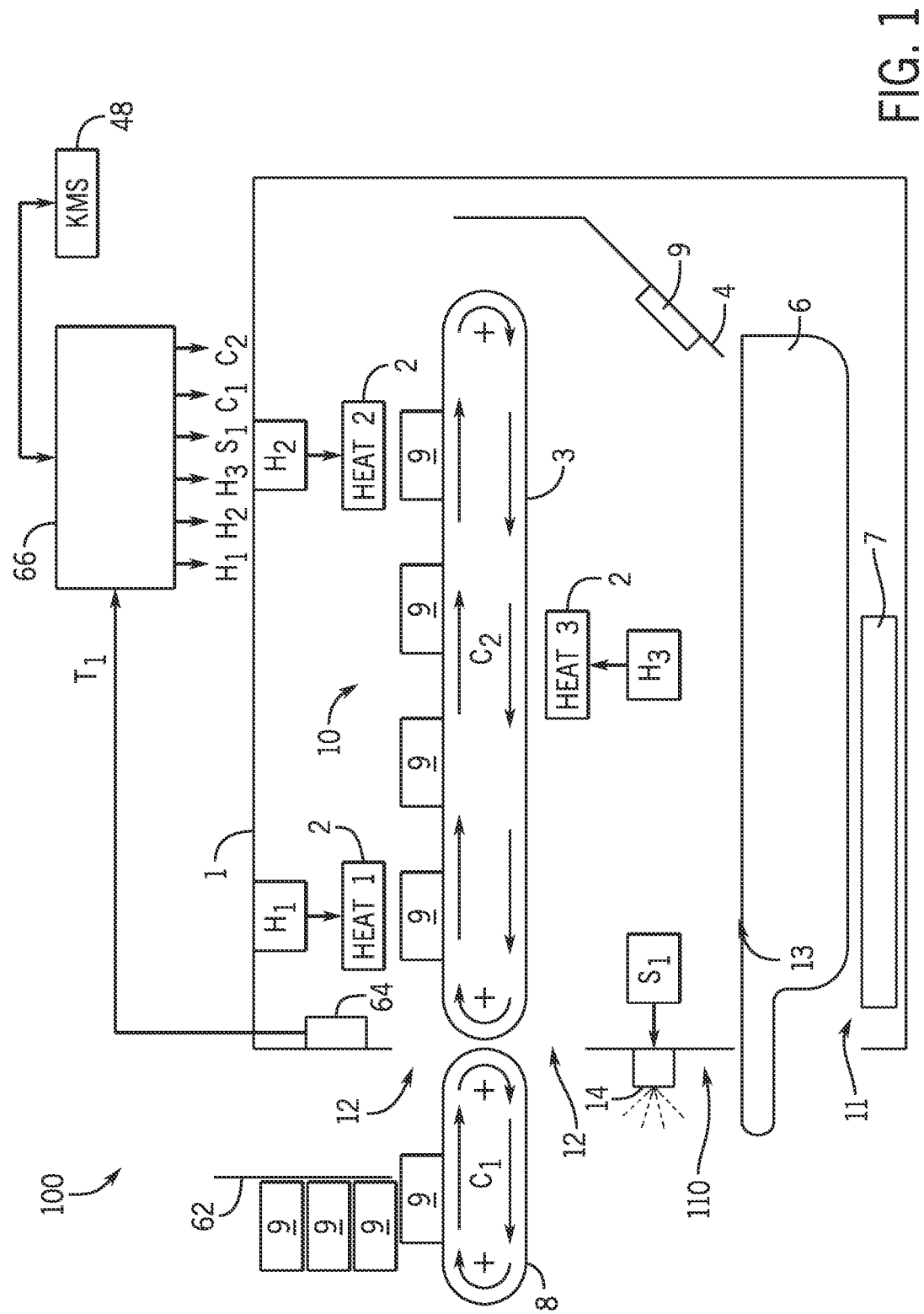
FIG. 1 depicts an example of a broiler.

FIG. 1 depicts an example of a heat transfer system in the configuration of a broiler 100. It will be recognized that the broiler 100 of FIG. 1 is merely exemplary and other examples and configurations of broilers will fall within the scope of the present disclosure that includes more or fewer components than depicted in FIG. 1. That is, a person of ordinary skill in the art will recognize from the present disclosure that the example shown and described with respect to FIG. 1 may be modified or rearranged or implemented with more or fewer systems or components and arrive at embodiments within the scope of the present disclosure. Additionally, while the example of a broiler is used herein as the heat transfer system, other configurations, including but not limited to ovens or toasters may be similarly implemented within the scope of the present disclosure.

Broiler 100 is shown to include heat sources 2 surrounded by an enclosure 1. Each heat source 2 as exemplarily described herein may be a gas burner. As will be described herein gas burners may include but are not limited to pipe burners and IR burners. In other examples, the heat sources 2 may be electric heating elements, infrared heating elements, or any other suitable form of heating element as would be recognized by one of ordinary skill in the art. Although FIG. 1 depicts the broiler 100 as including three heat sources 2, other embodiments may include one, two, four, or any other desired number of heat sources 2, in any arrangement or configuration, as will be recognized by a person having ordinary skill in the art in view of the present disclosure.

The enclosure 1 is formed by a plurality of walls 18. The walls of the enclosure 1 may be constructed of sheet metal. The enclosure 1 includes a food product inlet 12 that permits the ingress of a food product 9 to the cooking area exposed to heat sources 2 and encapsulated by the enclosure 1. The enclosure 1 further includes a food product outlet 11 that permits the egress of the food product 9 from the cooking area encapsulated by the enclosure 1. The types of food product 9 cooked by a cooking appliance as described herein may include raw, uncooked, par-baked, or frozen versions of food products. The food products may have a variety of sizes or weights, and may include, but are not limited to, hamburger patties, chicken breasts, bread, and pizza. A cooking conveyor 3 moves the food product through the enclosure. The cooking conveyor 3 includes a wire, metal plate, or silicone belt that is driven between two gears. The cooking conveyor 3 receives the food product 9 at the food product inlet 12 and moves the food product through the enclosure past the heat sources 2. The heat sources 2 directed at the conveyor 3, create a cooking environment 10 within which the heat input into the cooking environment 10 is controlled to carry out a cooking effect on the food product 9 as the food product moves through the cooking environment 10 on the conveyor 3. In an example, the cooking conveyor 3 may be configured with a plurality of lanes, each lane suitable to cook food product. In an example, the cooking conveyor 3 may include one, two, three, four, or more lanes, and be configured to simultaneously receive a food product in each lane across the width of the cooking conveyor 3. The lanes of the cooking conveyor 3 may be all defined upon a single cooking conveyor or may be spread across two or more cooking conveyors 3, for example with one conveyor providing one or two lanes.

Food product 9 may be optionally supplied to the food product inlet 12 using a loading conveyor 8 and a loading assembly 62. In another example, the cooking conveyor 3 may extend through the food product inlet 12 exterior of the enclosure 1. In such an example, the cooking conveyor 3 may be partially within the enclosure and partially exterior of the enclosure. Operation of the loading conveyor 8 moves food product 9 toward the food product inlet 12 of the enclosure 1. The loading assembly 62 may be any suitable device configured to store multiple food products 9 and to automatically deposit food product 9 onto the loading conveyor 8, which may for example be a hopper or magazine. In this way, a cooking cycle can be completed for a desired amount of food product 9 even when the desired amount of food product 9 exceeds a capacity of the enclosure 1. In other words, a cooking cycle for thirty hamburger patties can be completed for an enclosure 1 with a maximum internal capacity of five patties without the need for manual intervention. In an example, upon completion of a cooking cycle, a visual indicator 14 is activated to inform users that a cooking cycle has been completed. However, in other examples, both the loading conveyor 8 and any associated loading assembly may be omitted from the broiler 100, and food product 9 may be manually inserted onto the cooking conveyor 3, either through the food product inlet 12 or onto a portion of the cooking conveyor 3 exterior of the enclosure 1.

Food product 9 is moved through broiler 100 on the cooking conveyor 3. In an example, heat sources 2 are situated both above and below the cooking conveyor 3 in order to complete a cooking process of the food product 9. In the example of FIG. 1, two heat sources 2 are arranged above the cooking conveyor 3, while one heat source 2 is located below the cooking conveyor 3.

The broiler 100 may further include an inlet sensor 64. It will be recognized that more or fewer sensors may be used in association with other embodiments while remaining within the scope of the present disclosure. In an example detailed further herein, at least one inlet sensor is associated with each lane of the plurality of lanes of the cooking conveyor 3. Inlet sensor 64 may be any type of sensing device configured to collect data indicating the presence of a food product 9 in the vicinity of the food product inlet 12. In examples provided with more detail herein, the inlet sensor 64 is a temperature sensor, for example a thermocouple. The inlet sensor 64 is exemplarily located on the interior of the enclosure 1 at a position above the cooking conveyor 3, to sense temperature fluctuations associated with the introduction of food products into the inlet 12. The position of the inlet sensor 64 may be dependent on the field of view or the observable space the inlet sensor 64 is able to detect. In examples of broilers with more than one cooking conveyor 3, the broiler 100 may further include multiple inlet sensors 64.

Inlet sensor 64 transmits collected data as data signal Ti to a controller 66. The controller 66 may be internal to the broiler 100 or it may be external to the broiler 100. In an example, the controller 66 is a computer processor that is located within the broiler 100, in a location shielded from the heat, humidity, and food particles of the broiler 100. In another example, the controller 66 is a computer that is located remotely from the broiler 100 and for example, receives the sensor data either through wired or wireless communication and returns control signals as described in further detail herein through a similar communicative connection.

The cooking conveyor 3 includes an inlet end and an interior end. A food product discharge ramp 4 is shown to be situated within the enclosure 1 at the interior end of the cooking conveyor 3, opposite the inlet end of the cooking conveyor at the food product inlet 12. The food product discharge ramp 4 may be any device or assembly that deposits finished food product 9 in an intended location for further preparation, service, or storage. As will be described in further detail herein, examples of the discharge ramp 4 further redirect the finished food product 9 in a direction generally opposite the direction in which the food product 9 is moved by the conveyor 3. That is, in examples, if the conveyor 3 moves the food product 9 from inlet end of the conveyor 3 near the inlet 12 at the front of the broiler towards the interior end of the conveyor 3 at a rear of the broiler, the discharge ramp 4 redirects the food product 9 from the rear of the broiler towards the front of the broiler 100. The food product discharge ramp 4 may deposit finished food product 9 into a warming assembly 110. In an example, the warming assembly 110 is disposed within the enclosure 1 and beneath the cooking conveyor 3.

Figure 2:
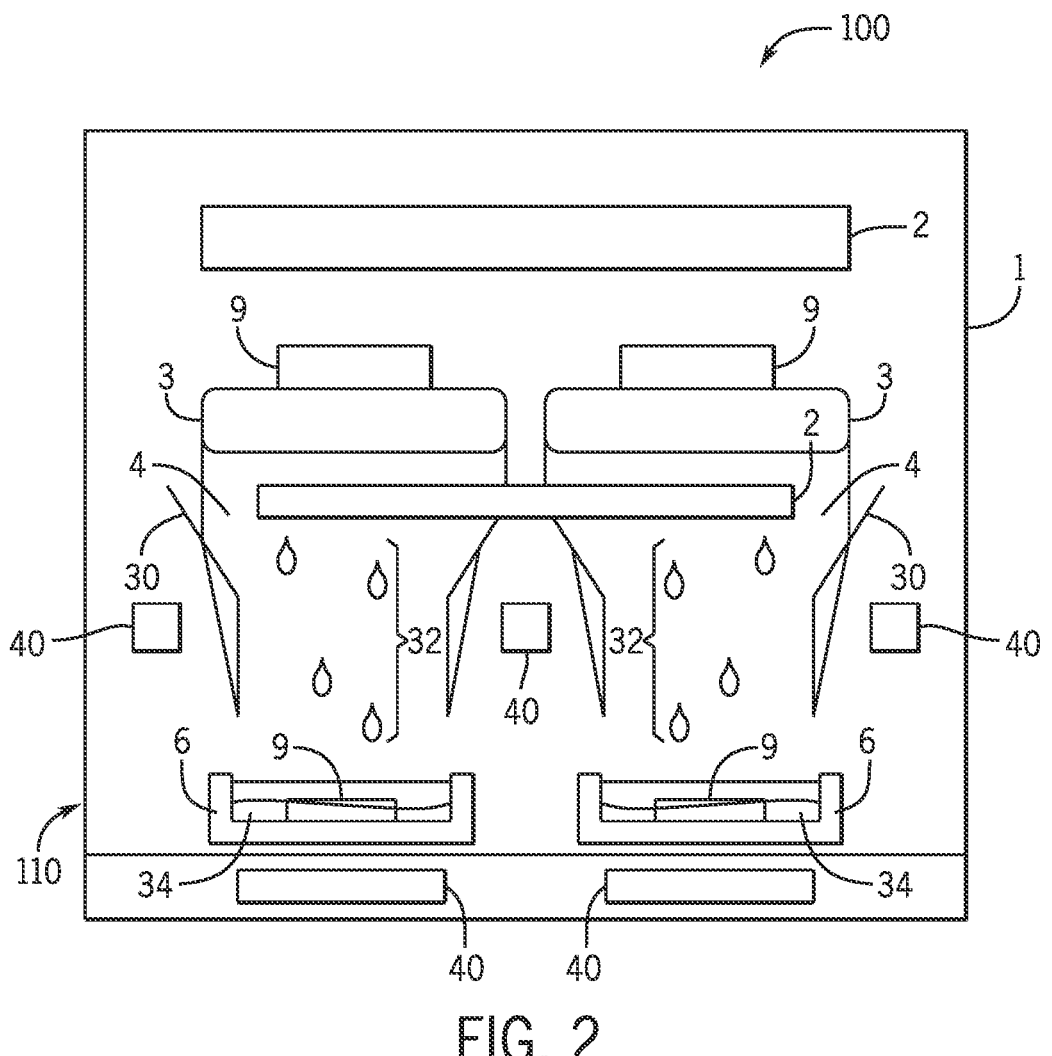
FIG. 2 is a schematic view of a broiler with a warming assembly.

FIG. 2 depicts a schematic example of a broiler 100. Heat sources 2 are provided above and exemplarily below the cooking conveyors 3 and are configured to direct heat into the food products 9 moved on the cooking conveyors 3. As previously described, a discharge ramp 4 is positioned at an opposite end of the cooking conveyors 3 to direct cooked food products 9 into the pans 6 located within the controlled environment 13 of the warming assembly 110.

The warming assembly 110 may be configured to rely upon the heat supplied from the heat sources 2 rather than any additional heating sources. However, it will be recognized that optionally one or more warming heaters may be located within the warming assembly, for example at one or more of locations 40 identified in FIG. 2. The warming assembly 110 is configured such that liquid 32 (which exemplarily includes water, grease, fat, and bits of food and char entrained therein) falling from the food products 9 on the cooking conveyors 3 is directed into and collected within the pans 6 as pooled liquid 34. The pooled liquid 34 exemplarily includes water, grease, fat, and bits of food. The pooled liquid 34 helps to maintain the temperature and humidity of the food products 9 in the pans 6 while in the warming assembly 110. Because each cooking conveyor 3 operates through a cook cycle to cook food products 9 to fill the pan 6, an expected amount of liquid 32 can be accounted for in the volume of the pan 6. In broilers, collection of the liquid 32 in grease traps or pans is a constant source of maintenance and cleaning. In the present example, the collected liquid 34 is removed from the broiler after each cook cycle, preventing buildup of grease and fouling of components within the broiler. In examples, drip trays 30 may be located within the warming assembly 110 to help direct the liquid 32 from the cooking conveyors 3 into the pans 6. In an example, the drip trays 30 may collect the liquid 32 and divert it onto the discharge ramp 4 wherein the liquid 32 is subsequently directed into the pan 6 along with the cooked food product. In still further examples, these drip trays 30 may further block the liquid 32 from impinging upon the lower heat source 2 or to warming heaters, for example at locations 40 or other locations.

It has been recognized by the present inventors that the discharge ramp 4 may become excessively hot during operation of the broiler 100. The temperature of the discharge ramp 4 contributes to the dehydration and oxidation of water, grease, fat, and bits of food and char from the cooked food product as it slides down the discharge ramp. In such embodiments as described above, this also includes dehydration and oxidation of the liquid 32 collected by the drip tray 30 and directed onto the discharge ramp 4. Exposure to radiant heat energy from the heat sources 2 heats the discharge ramp and further contributes to this dehydration and oxidation. When dehydrated and oxidized, the water, grease, fat, and bits of food and char turn into a sticky paste which causes the food products 9 to stick to the discharge ramp 4 rather than slide to the pans 6. As the liquid dehydrates and oxidizes, it tends to absorb more heat energy, only contributing to the cycle, which can cause fouling or damage of the surface of the discharge ramp 4.

Figure 3:
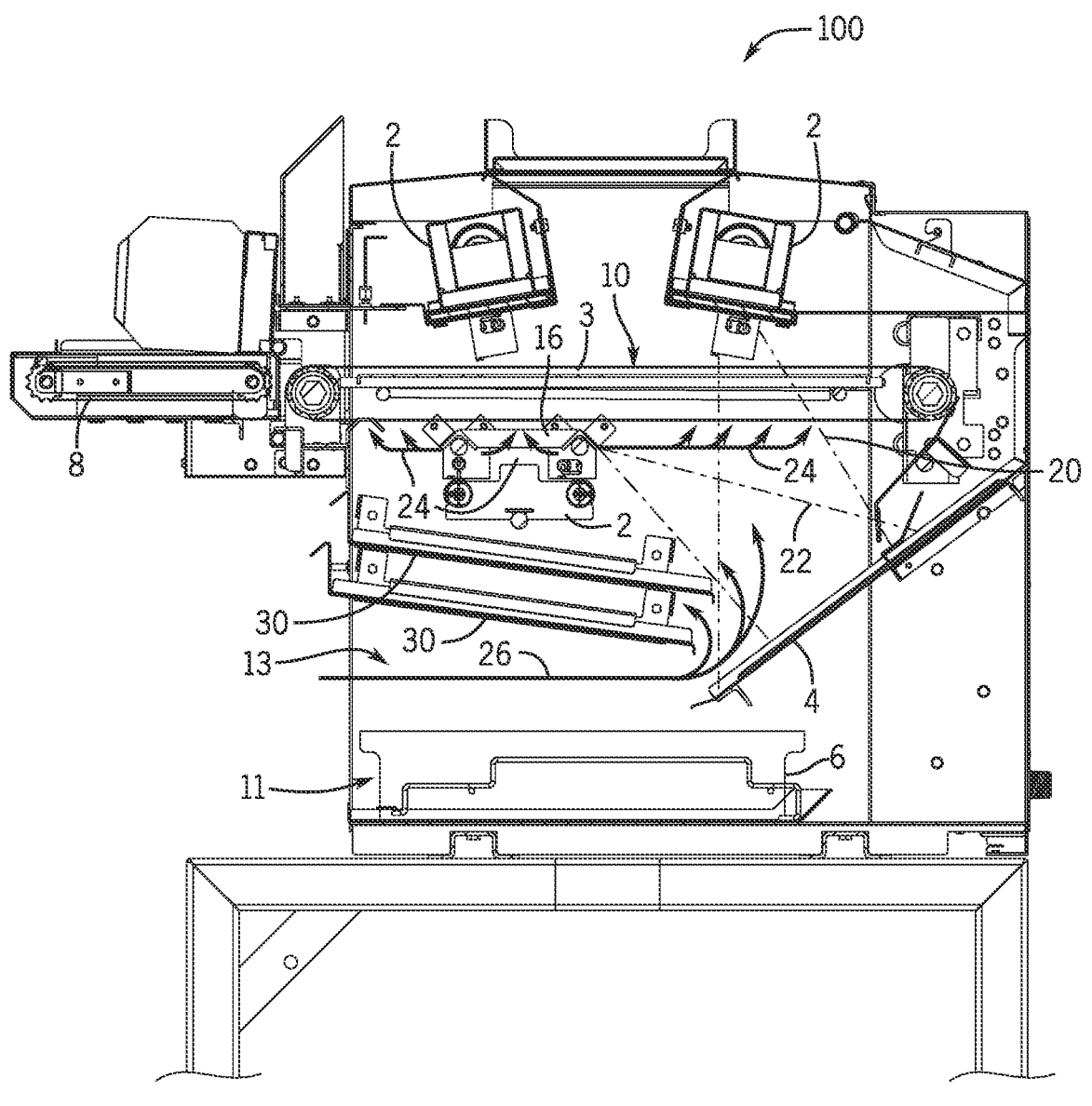
FIG. 3 is a sectional view of an example of a broiler.

FIG. 3 is a sectional view of an example of the broiler 100, for the sake of description, without the baffles as described in further detail herein. The broiler 100 of FIG. 3 may include many or all of the components as shown and described above with respect to FIG. 1 or 2. FIG. 3 further depicts the heat sources 2 are exemplarily different types of heat sources within the broiler 100. In the example depicted in FIG. 3, the heat sources 2 located above the cooking conveyor 3 are exemplarily gas-fired infrared (IR) burners, while the heat source 2 located below the cooking conveyor 3 is a pipe or tube burner. The gas-fired IR burner may include a metal foam or a metal mesh that is heated by gas combustion to a temperature that emits IR energy in the direction of the cooking conveyor 3. The broiler 100 further exemplarily includes at least one drip tray 30 positioned below the cooking conveyor 3 below the lower heat source 2 and above the pan 6. Each lane for food product across the cooking conveyor(s) 3 may have a pan 6 located within the warming assembly 110 to receive the cooked food product 9 off of the ramp 4. A drip tray 30 may further be associated with each lane of the food product as well. The drip tray 30 may be a single tray that spans multiple lanes or conveyors, while in other examples, individual trays are associated with individual conveyors or lanes within the broiler. The drip tray 30 is positioned below the cooking conveyor 3 to collect any liquid 32 (e.g. water, fat, grease, and/or food particles) from the cooking food product that falls through the cooking conveyor 3. Additionally, the drip tray 30 is angled in a direction towards the ramp 4, whereby the liquid 32 is directed onto the ramp 4 and thereby into the pan 6 along with the cooked food product.

FIG. 3 further schematically depicts relevant air and radiant energy flow within the broiler 100. While radiant energy will emit in all directions from the emitter portion of the IR burner heat source 2, a portion 20 of the radiant energy from the rear upper IR burner heat source 2 projects through the conveyor 3 and onto the ramp 4. Relatedly, the conveyor 3 absorbs heat from the heat sources 2 and itself radiates heat, a portion of which is in the direction of the ramp 4. Similarly, a portion 22 of the radiant energy from the lower pipe burner heat source 2, including from the burner flame itself as well as energy radiating off of the burner heat shield 16 is directed onto the ramp 4. Hot convective airflow 24 circulates upward from the lower burner heat source 2 through the cooking conveyor 3. The broiler may further include a vent 74 which is configured to draw heat and combustion gasses out of the broiler 100. Atmospheric air 26 is drawn into the enclosure 1 through the food product outlet 11 and towards the cooking environment 10 about the heat sources 2. The inventors have discovered that the broiler 100 of FIG. 3 may expose the ramp 4 to excessive IR radiant energy 20, 22 from the heat sources 2, which increases the temperature of the discharge ramp 4 leading to the problems noted above.

Figure 4:
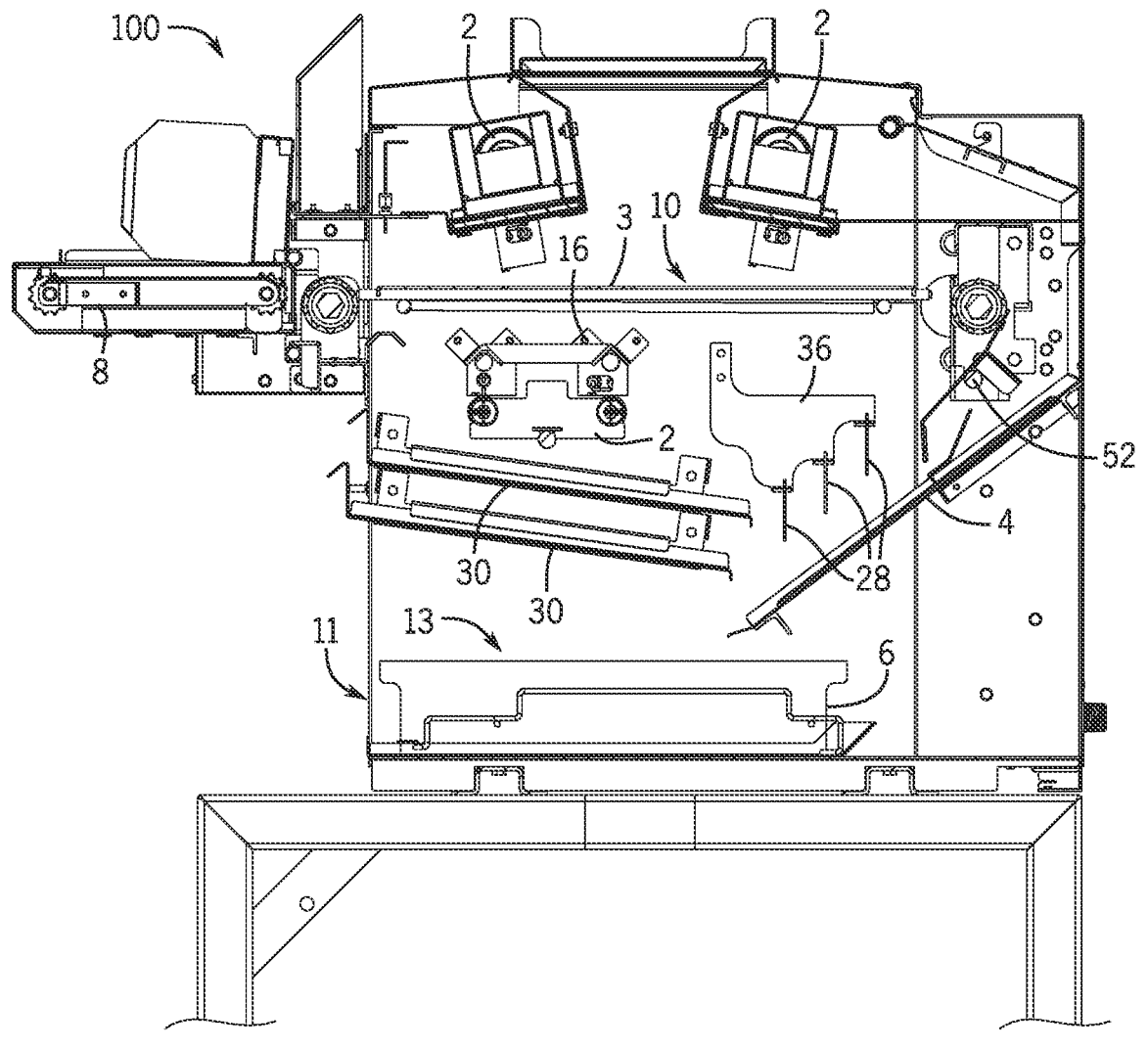
FIG. 4 is a sectional view of an example of the broiler with internal baffles.

FIG. 4 is a cross-sectional view of a further example of a broiler 100 that includes internal baffles 28. The internal baffles 28 are exemplarily secured to the enclosure 1 by a bracket 36 secured to opposing sidewalls of the enclosure 1. The baffles 28 are exemplarily constructed of sheet metal, for example stainless steel or aluminum, although other metals may be used while remaining within the scope of the present disclosure. The baffles 28 are dimensioned to interfere with or obstruct the IR radiant energy 20, 22 from the heat sources 2, while permitting the ambient air 26 to flow into the cooking chamber. The baffles 28 therefore extend across the width of the ramp 4 and are elongated in a height dimension, while thin in a depth dimension. The IR radiant energy impinges upon the baffles 28 and the baffles 28 absorb the energy, effectively casting a shadow on the discharge ramp 4, limiting the radiant energy absorbed by the ramp 4.

Three baffles 28 are depicted in the example of FIG. 4, although it is recognized that more or fewer baffles 28 may be used in other implementations while remaining within the present disclosure. The baffles 28 are exemplarily staggered in their vertical and depth positions, for example to follow the angle of the discharge ramp 4. In such an example, each baffle 28 is a same height and a same clearance distance is maintained between bottom edges of each of the baffles and the surface of the ramp 4.

While the baffles 28 are depicted as being vertically oriented, it will be recognized that in other examples, the baffles 28 may be at other angles within the broiler 100. However, it has been found that the vertically-oriented baffles 28, limit accumulation of liquid 32 on the baffles themselves 28. In experimentation, it has been found that liquid 32 may accumulate on baffles 28 oriented at other angles and exhibit similar fouling as described above. Therefore, vertically oriented baffles 28 have been found to provide improved longevity.

Figure 6:
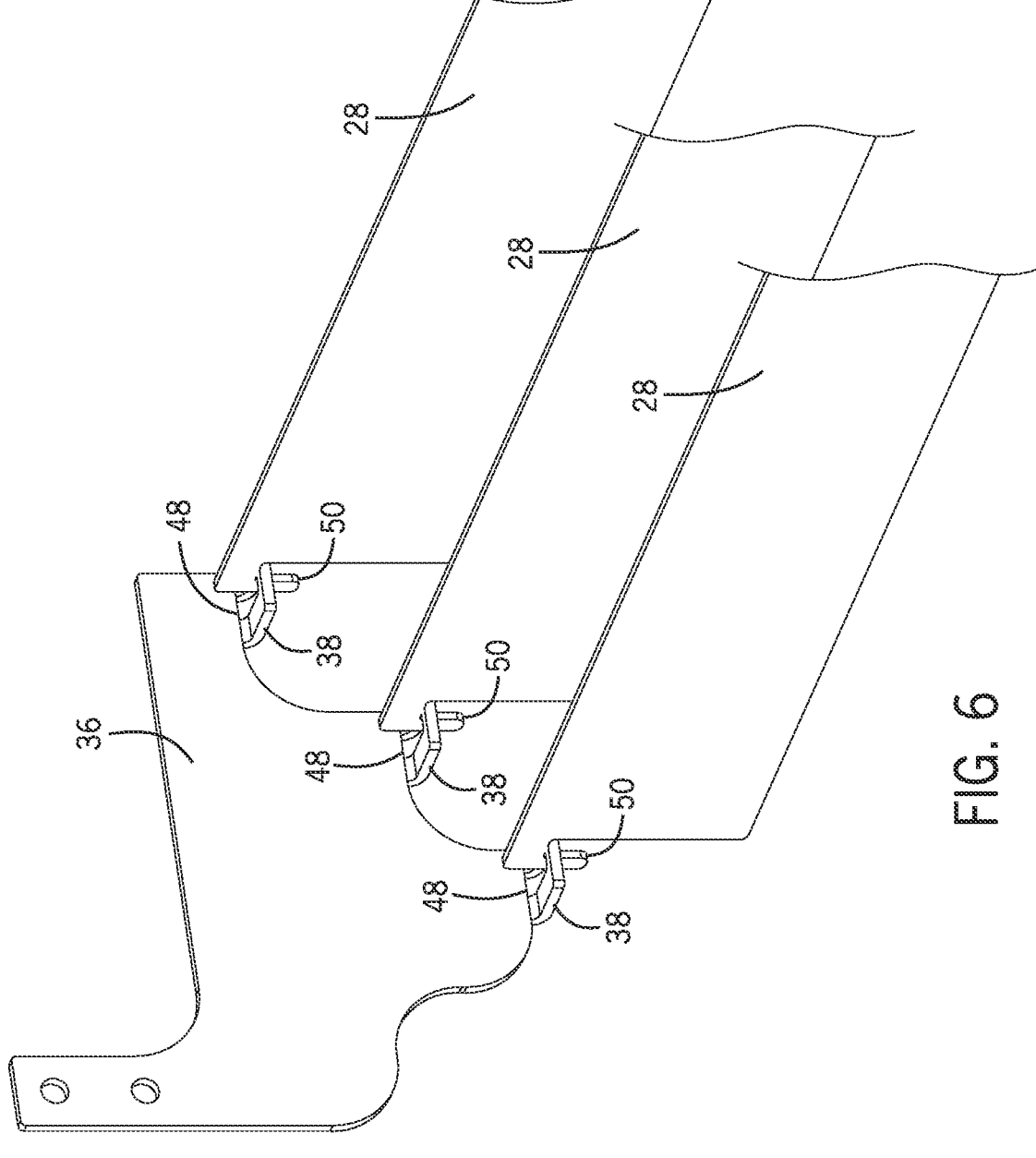
FIG. 6 is a detailed view of an example of internal baffles.

FIG. 6 is an isolated and detailed view of the baffles 28 and one bracket 36. It will be recognized that the baffles 28 may be secured at either end to the enclosure 1 by a bracket 36, although a single bracket 36 is depicted for clarity. The bracket 36 includes a series of tabs 38, each with an aperture 48. The aperture 48 through the tab 38 is configured to receive a projection 50 downwardly extending from the baffle 28. The baffles 28 are removably connected to the brackets 36 and similarly to the enclosure 1 in this manner. This facilitates removal of the baffles 28 for cleaning, maintenance, or replacement.

Returning to FIG. 4, the broiler 100 further includes a ramp inlet shield 52 that includes two shield portions. One portion extends from the underside of the conveyor 3 starting tangentially to the path of the conveyor 3 and extends for a distance at an angle generally parallel to that of the discharge ramp 4. In examples, the angles between this portion of the may match those of the discharge ramp 3 as described herein. The other portion is a blocking portion that extends in a vertical or near vertical direction towards the surface of the discharge ramp 4. The blocking portion leaves a gap between a lower edge of the blocking portion and the surface of the discharge ramp 4, through which the cooked food product may pass. The ramp inlet shield 52 serves two purposes. The portion of the ramp inlet shield 52 closest to the conveyor 3 helps to separate any food products from the conveyor which may be stuck from the cooking process. Secondly, the blocking section of the ramp inlet shield 52 operates as an additional baffle as described herein to further block IR radiant energy from the ramp 4.

Figure 5:
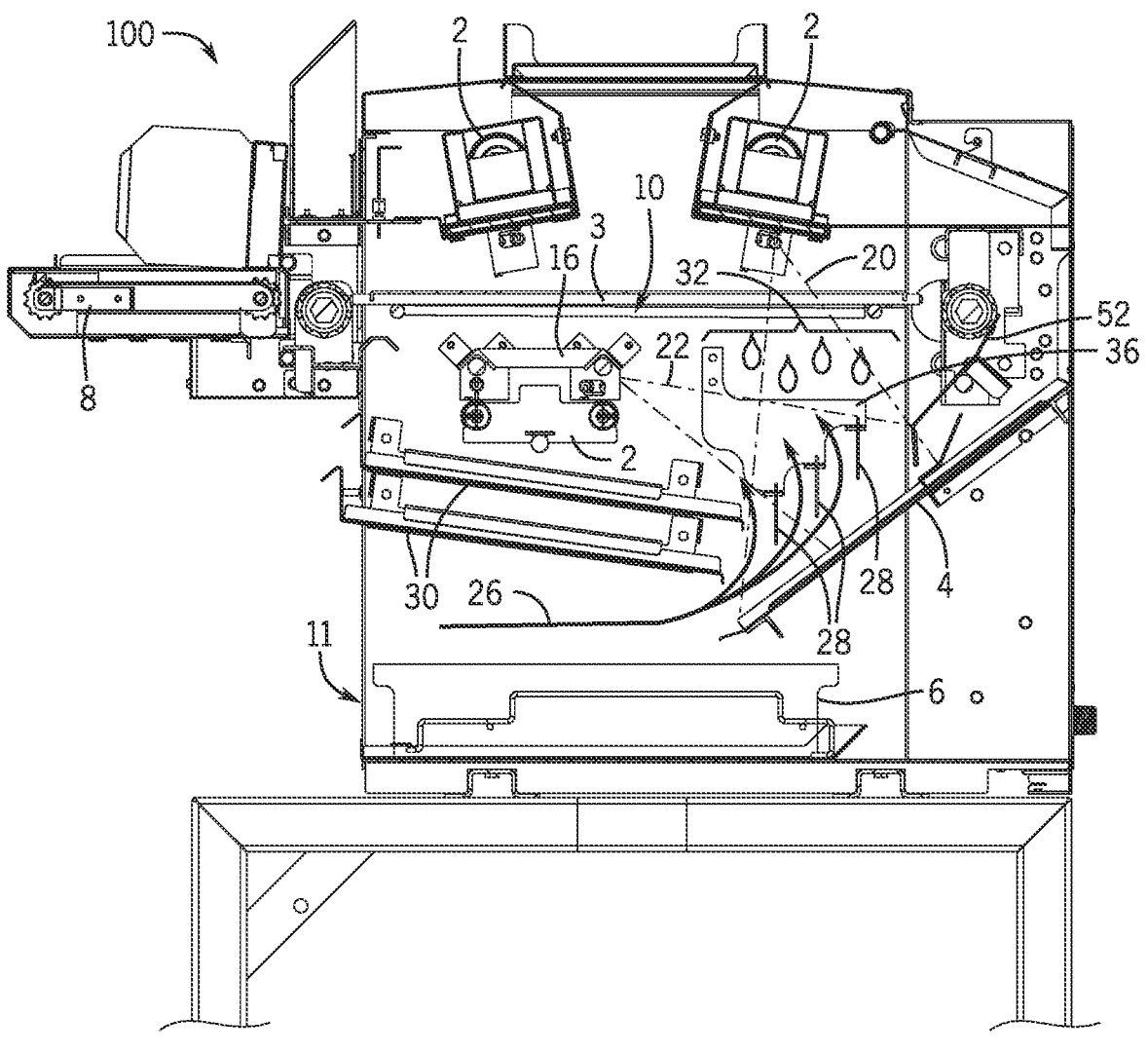
FIG. 5 is the section view of FIG. 4 depicting radiant energy and airflow within the broiler.

FIG. 5 is the same as FIG. 4, but with a schematic depiction of the relevant air and radiant energy flow within the broiler 100, similar to that of FIG. 3. In FIG. 5, radiant energy portion 20 from the rear upper IR burner heat source 2 projects through the conveyor 3 in the direction of ramp 4. Radiant energy portion 22 from the lower pipe burner heat source 2, including from the burner flame itself as well as from the burner heat shield 16 projects in the direction of the ramp 4. Hot convective airflow 24 circulates upward from the lower burner heat source 2 through the cooking conveyor 3 in the direction of vent 74. Atmospheric air 26 is drawn into the enclosure 1 through the food product outlet 11 and towards the cooking environment 10 and the heat sources 2.

The baffles 28 serve two purposes in FIG. 5, first the baffles 28 block some or all of the IR radiant energy portions 20, 22 from reaching the ramp 4, instead, the energy is absorbed in the baffles 28 themselves. Secondly, the baffles 28 direct the comparatively cooler ambient air 26 past the baffles, which in turn facilitates heat transfer from the baffles 28 to the ambient air 26, which simultaneously heats the ambient air 26 and cools the baffles 28. Embodiments of this arrangement can thus improve the functioning of the broiler 100 by heating the ambient air 26 before it reaches the heat sources 2. By convective cooling of the baffles 28 with the ambient air 26, the baffles 28 are able to absorb the IR radiant energy portions 20, 22, while limiting energy radiated from the baffles 28 themselves, thus providing improved limiting of heat transfer to the ramp 4.

In further examples, the ramp 4 may be configured to facilitate the continued sliding of the food products down the ramp. In examples, the ramp 4 may include a surface treatment. The surface treatment may be a dimpled or textured surface to reduce the contact area and therefore the friction between the discharge ramp 4 and the cooked food products. The dimpled or textured surface may further operate to prevent a "suction" effect that may be observed between voids on the surface of the food product in contact with the surface of the discharge ramp and the liquids 32 present on the ramp 4 as well. In another example, the surface treatment of the ramp 4 may be a polished ramp surface, for example with a #4 or a #8 finish. In an example, a polished surface may be smoother, thus promoting sliding of the food product, and reflective, to operate to reflect some of the radiant IR energy. The ramp may further be covered with a non-stick coating, for example, PTFE, ceramics, or enamel. As a still further example, the surface treatment of the ramp 4 may be an addition of a wire rack (not depicted) above the surface of the discharge ramp 4. The wire rack minimizes contact with the cooked food product and elevates the food product from the surface of the ramp 4. The surface treatment may further include a PTFE or other polymer sheet.

Figure 7:
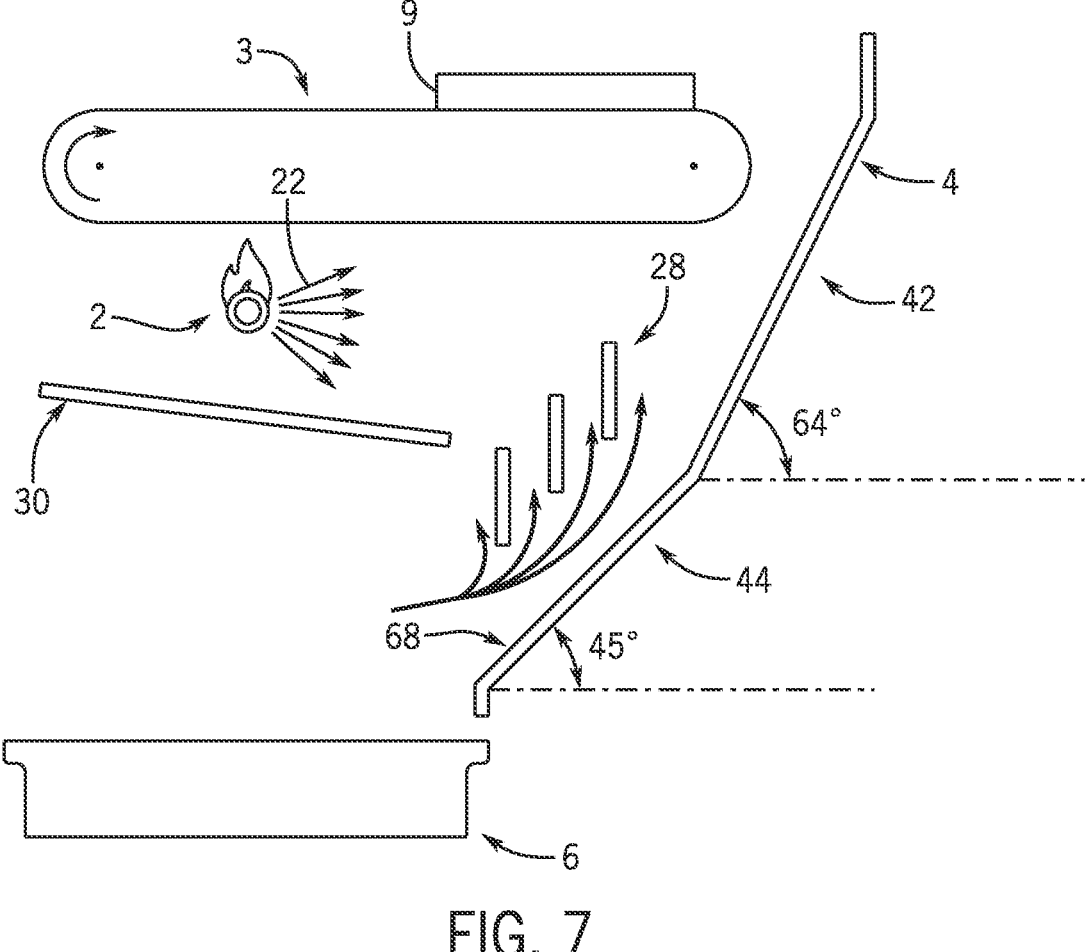
FIG. 7 is a sectional schematic view of a broiler with baffles and a ramp.
Figure 8:
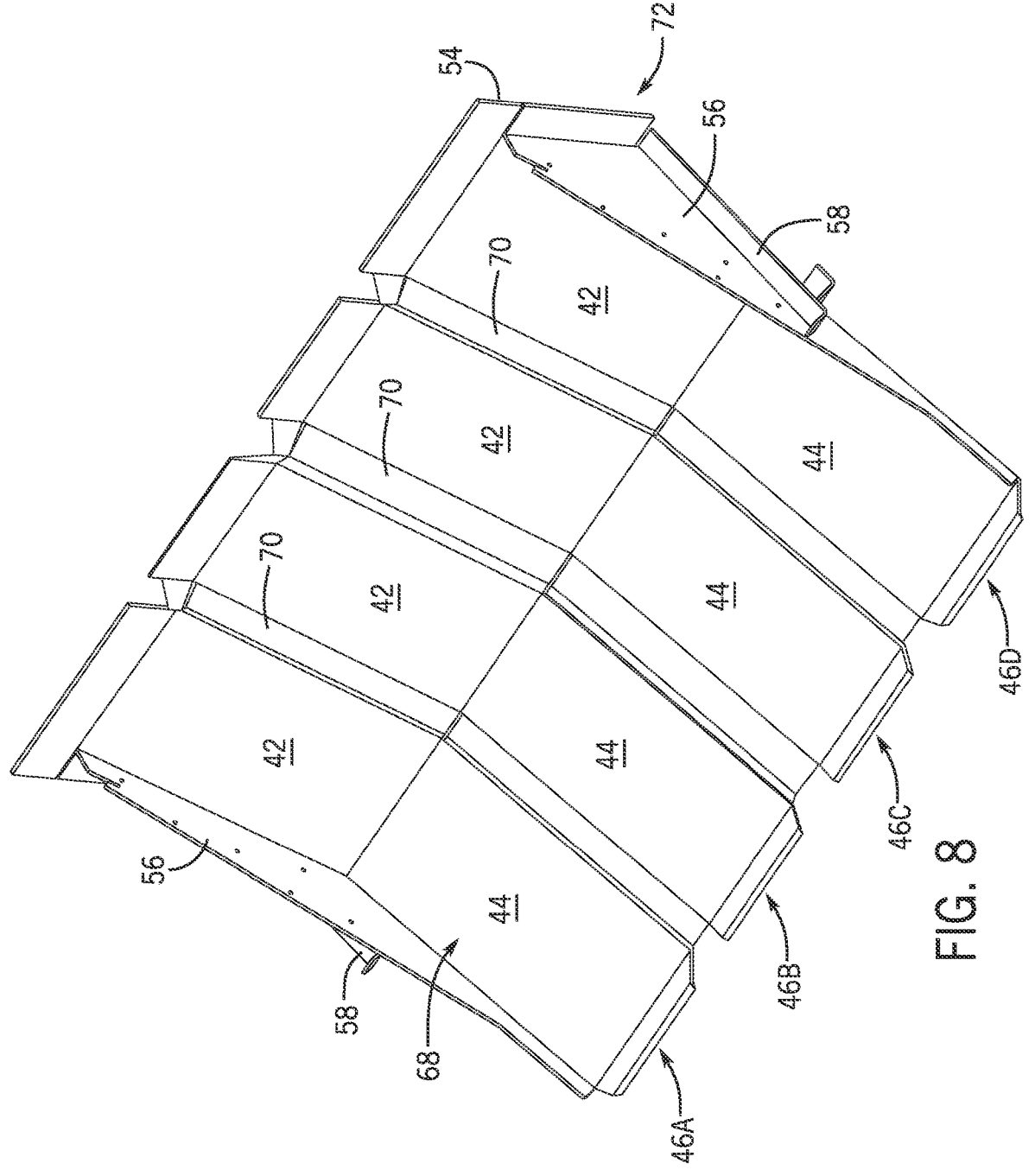
FIG. 8 is a perspective view of a ramp.
Figure 9:
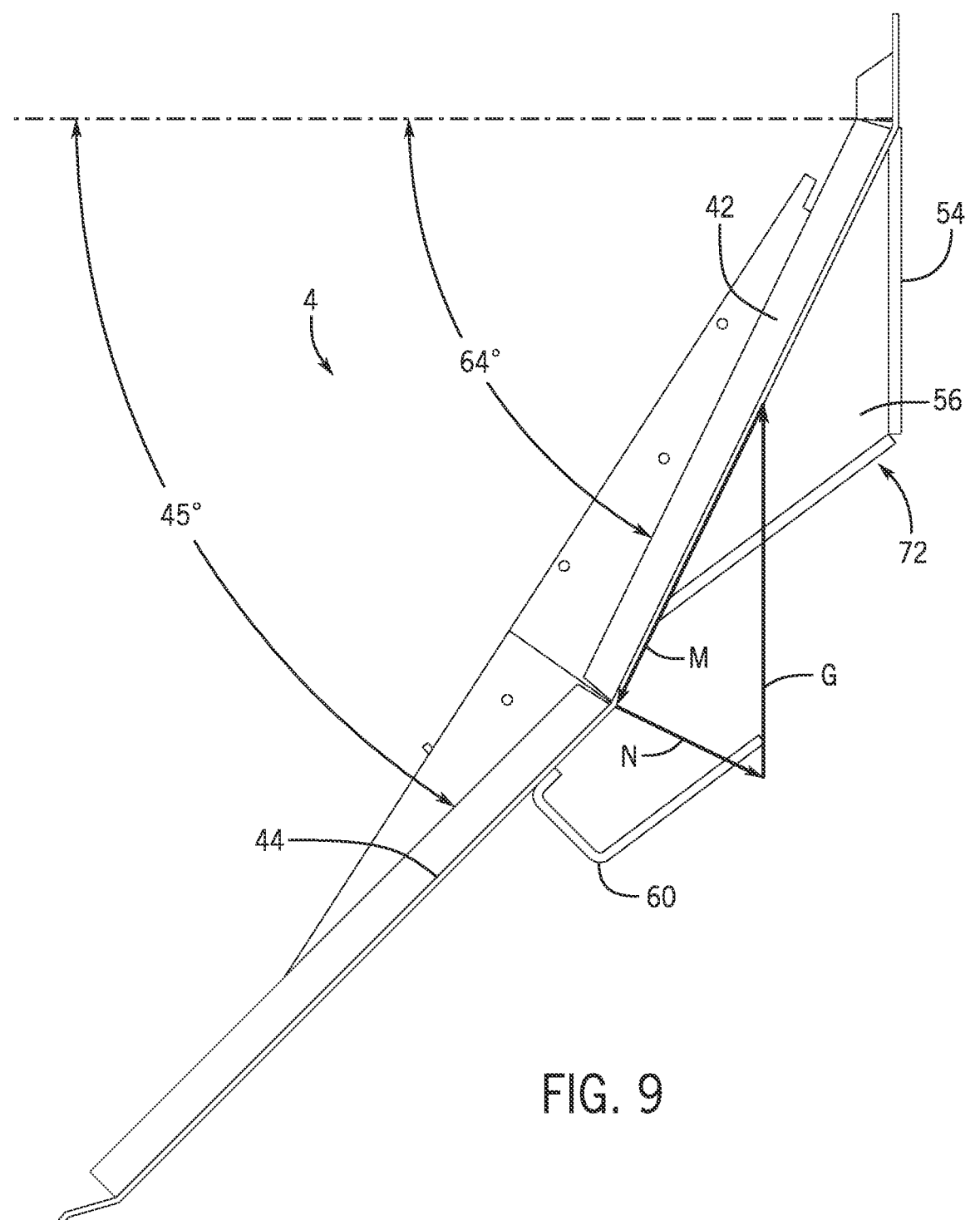
FIG. 9 is a side sectional view of the ramp of FIG. 8.

FIGS. 7-9 provide examples of configurations of the ramp 4 as may be used in combination with, or independently from, the previously described baffles 28. FIG. 7 is a sectional schematic view of a broiler with baffles and a ramp 4. The ramp 4 shown in FIG. 7 extends from an upper end in proximity to the interior end of the cooking conveyor 3 to a lower end, for example within the warming assembly and exemplarily below the cooking conveyor 3 and the drip tray 30. The ramp 4 includes two portions, an entry portion 42, which includes the upper end, and an exit portion 44, which includes the lower end. The entry portion 42 is oriented at a more steep angle relative to horizontal than the exit portion 44. In examples, the entry portion 42 is oriented at an angle greater than 45° but less than 90°, and more specifically is oriented at an angle greater than 60°, and further may be at an angle equal to or greater than 64°. The angle of the entry portion is less than 90° and in further examples, may be less than 80° or less than 70°. One example of the entry portion is angled at 64°. The exit portion 44 is oriented at an angle less than that of the entry portion 42. More specifically, the exit portion 44 has an angle of 45° or less. In still further examples, the angle of the exit portion 44 is less than 40°, and in one example is 37°.

The cooked food product 9 leaves the conveyor 3 and falls onto the entry portion 42 of the ramp 4. As previously described, a ramp inlet shield (FIG. 5) may help to separate the cooked food product 9 from the conveyor 3. The cooked food product 9 has kinetic energy from the movement of the conveyor 3 as well as acceleration due to gravity as food product falls from the conveyor 3. The angle of the entry portion 42 as described above reduces the impact of the food product 9 against the ramp 4, which results in less initial mechanical energy loss by the food product. This in turn increases the sliding velocity of the cooked food product 9 down the entry portion 42 of the ramp 4. Increased sliding velocity of the cooked food product 9 down the entry portion 42 further results in an increased velocity of the cooked food product 9 on the exit portion 44 of the ramp 4. Increased velocity of the cooked food product 9 down the ramp 4 reduces the time that the cooked food product 9 and any associated grease or food particles remain in contact with the discharge ramp 4, which combined with lowered temperature of the ramp surface from the baffles 28, reduces the carbonization on the ramp 4.

FIG. 8 is a perspective view of a ramp 4. The entry portion 42 and the exit portion 44 can be seen in this view. The ramp 4 exemplarily includes four lanes 46A-D. As previously noted, the broiler may include one or more conveyor(s) 3 across which one or more lanes of food product are cooked. The lanes 46A-D of the ramp 4 correspond to the respective lanes of the one or more conveyor(s) 3. In the example depicted in FIG. 8, the surface 68 of the ramp 4 is provided by sheet metal and dividers 70 between the respective lanes 46 are provided as crimps or bends in the sheet metal. It will further be recognized that the entry portions 42 and the exit portions 44 may be separately constructed of unitary pieces of sheet metal and the ramp 4 assembled therefrom.

The ramp 4 further includes a mounting bracket 72, which includes a back panel 54 and side panels 56. The back panel 54 is configured to be arranged vertically when the ramp 4 is positioned within the broiler 100 with the angulation of the entry portion 42 and the exit portion 44 as described above. The back panel 54 is configured to be secured to a back wall of the enclosure 1, for example by welding, rivets, or screws. The side panels include a flange 58 which extends from a respective side panel 56 in a direction away from the surface 68 of the discharge ramp 4. The flange 58 lends structural support to the discharge ramp 4 as well as a further point of connection at which the discharge ramp 4 may be secured to the enclosure 1 of the broiler 100.

FIG. 9 is a side sectional view of the discharge ramp of FIG. 8. In the sectional view of FIG. 9, the angulation of the entry portion 42 and the exit portion 44 of the discharge ramp 4 can be better seen. Also shown is an exit portion support bracket 60 which is secured to the exit portion 44 and further is likewise configured to be directly or indirectly connected to the enclosure 1 by which the exit portion 44 is supported. FIG. 9 further includes reference arrows. Arrow G represents the force of gravity. Due to the angle of the entry portion 42 being greater than 45°, the force component of a cooked food product falling onto the entry portion 42 in the direction of motion of the cooked food product, arrow M, is greater than the normal force component, arrow N. Thus more force of the cooked food product is transferred to motion, than to friction as the cooked food product moves along the entry portion 42 of the discharge ramp 4.

It was previously observed that discharge ramp surfaces within the broiler could reach temperatures of 350° F.-400° F. Examples of the baffles 28 and/or the discharge ramps 4 as disclosed herein have been observed in testing to result in reduced temperatures of the discharge ramp, for example at the exit portion 44 of the discharge ramp, for example below 250° F., below 230° F., or between 230° F.-180° F. Reduction of the temperatures of the discharge ramp to these temperatures has been found to further limit and prevent discharge ramp fouling. In some examples, the discharge ramp may be operated without the use of PTFE or similar polymer lining sheets. The above-noted reduction in fouling of the ramp, similarly results in more collection of the liquid 32 either in the pans 6 or in another intended location. Accumulation of the liquid 32 and the e.g. water, grease, fat, and/or food contained therein in locations of high temperature creates a condition for flare ups within the cooking environment 10, when these substances combust separately from the combustion of the heat sources 2. Flare-ups reduce cooking quality and thermal control within the broiler. The reduction of both accumulation of the liquid 32 on the ramp and the temperature of the ramp, further reduces flare-up risk in this location.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification. It will be recognized that features disclosed herein may be used in combination with the features disclosed in any or all of the cited references incorporated herein by reference while remaining within the scope of the present disclosure.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A heat transfer system for heat treatment of a food product, the system comprising:
   an enclosure comprising a food product inlet, a food product outlet, and a plurality of walls;
   at least one conveyor extending into the enclosure from the food product inlet;

at least one heat source arranged relative to the at least one conveyor, the at least one heat source configured to output heat towards the at least one conveyor;
   a ramp at least partially extending below the conveyor; and
   a plurality of baffles positioned intermediate to the ramp from the at least one conveyor and the at least one heat source, wherein the baffles of the plurality of baffles are spaced apart in a depth dimension and are staggered in a vertical dimension.

2. The heat transfer system of claim 1, wherein the at least one baffle extends across a width of the enclosure between the opposing side walls and is elongated in a vertical dimension compared to a depth dimension.

3. The heat transfer system of claim 1, wherein the plurality of baffles are configured to be heated by radiant heat from the at least one heat source and cooled by convective cooling with airflow entering the enclosure through the food product outlet.

4. The heat transfer system of claim 1, further comprising a ramp inlet shield which comprises a first portion tangential to the conveyor, a second portion parallel to the discharge ramp, and a third portion extending vertically.

5. A heat transfer system for heat treatment of a food product, the system comprising:
   an enclosure comprising a food product inlet, a food product outlet, and a plurality of walls;
   a ramp;
   at least one conveyor extending into the enclosure from the food product inlet, the at least one conveyor comprises an inlet end and an interior end and wherein an upper end of the ramp is positioned in proximity to the interior end of the at least one conveyor and a lower end of the ramp is positioned below the at least one conveyor;
   at least one heat source arranged relative to the at least one conveyor, the at least one heat source configured to output heat towards the at least one conveyor;
   at least one baffle positioned intermediate to the ramp from the at least one conveyor and the at least one heat source.

6. The heat transfer system of claim 5, wherein the ramp is configured to receive food product from the at least one conveyor and direct the food product towards the food product outlet.

7. The heat transfer system of claim 6, further comprising a warming assembly defined within the enclosure interior of the food product outlet, the warming assembly configured to removably receive therein a pan positioned below the lower end of the ramp.

8. The heat transfer system of claim 5, wherein an entry portion of the ramp comprises the upper end of the ramp and an exit portion of the ramp comprises the lower end of the ramp, and the entry portion is at a first angle and the exit portion is at a second angle, wherein the first angle is greater relative than the second angle.

9. The heat transfer system of claim 1, further comprising a drip tray having a lower end and an upper end and positioned within the enclosure below the at least one conveyor and the at least one heat source, wherein the drip tray is angled within the enclosure with the lower end proximate the ramp compared to the upper end.

10. A heat transfer system for heat treatment of a food product, the system comprising:
   an enclosure comprising a food product inlet, a food product outlet, and a plurality of walls;

at least one conveyor extending into the enclosure from the food product inlet, the at least one conveyor extending from an inlet end to an interior end;

at least one heat source arranged relative to the at least one conveyor, the at least one heat source configured to output heat towards the at least one conveyor;

a ramp extending from the conveyor toward the food product outlet, wherein the ramp comprises an entry portion having a first angle and comprising an upper end of the ramp and the upper end is positioned in proximity to the interior end of the at least one conveyor, and an exit portion having a second angle and comprising a lower end of the ramp and the lower end of the ramp is positioned in below the at least one conveyor, wherein the first angle is greater than the second angle; and a warming assembly defined within the enclosure interior of the food product outlet, the warming assembly configured to removably receive therein a pan positioned below the lower end of the ramp.

11. The heat transfer system of claim 10, wherein the ramp comprises a surface treatment configured to promote sliding of food product on the ramp.

12. The heat transfer system of claim 10, wherein the first angle is greater than 45 degrees and less than 90 degrees and the second angle is less than 45 degrees and greater than 0 degrees.

13. The heat transfer system of claim 12, wherein the first angle is greater than 60 degrees and less than 80 degrees.

14

14. The heat transfer system of claim 10, wherein the ramp comprises a plurality of lanes, the plurality of lanes separated by dividers.

15. The heat transfer system of claim 14, wherein the dividers are unitary with the ramp.

16. The heat transfer system of claim 10, further comprising a plurality of baffles positioned intermediate to the ramp from the at least one conveyor and the at least one heat source, wherein the plurality of baffles are configured to be heated by radiant heat from the at least one heat source and cooled by convective cooling with airflow entering the enclosure through the food product outlet.

17. A heat transfer system for heat treatment of a food product, the system comprising:

an enclosure comprising a food product inlet, a food product outlet, and a plurality of walls;

at least one conveyor extending into the enclosure from the food product inlet;

at least one heat source arranged relative to the at least one conveyor, the at least one heat source configured to output heat towards the at least one conveyor;

a ramp at least partially extending below the conveyor; and a plurality of baffles positioned intermediate to the ramp from the at least one conveyor and the at least one heat source, wherein lower edges of the baffles are evenly spaced apart from a surface of the ramp.

* * * * *